Patented Aug. 11, 1931

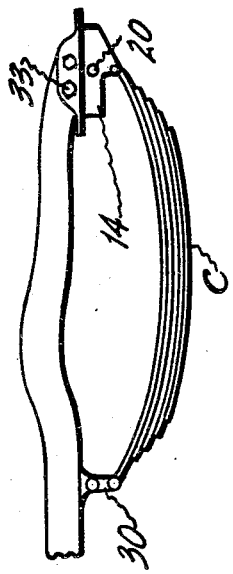
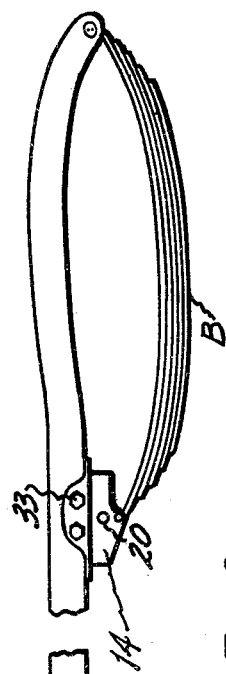
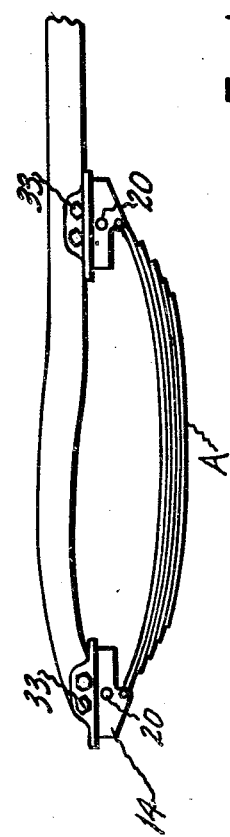
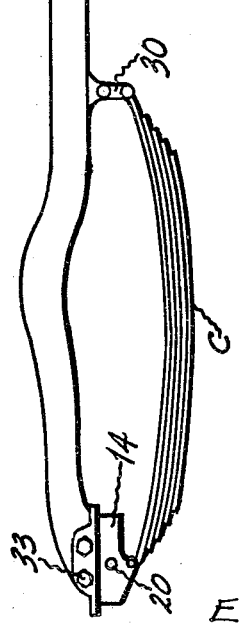
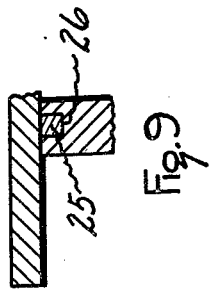
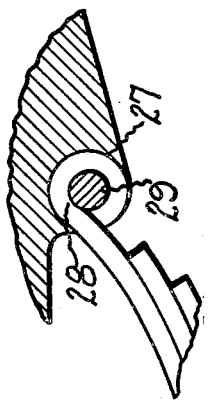

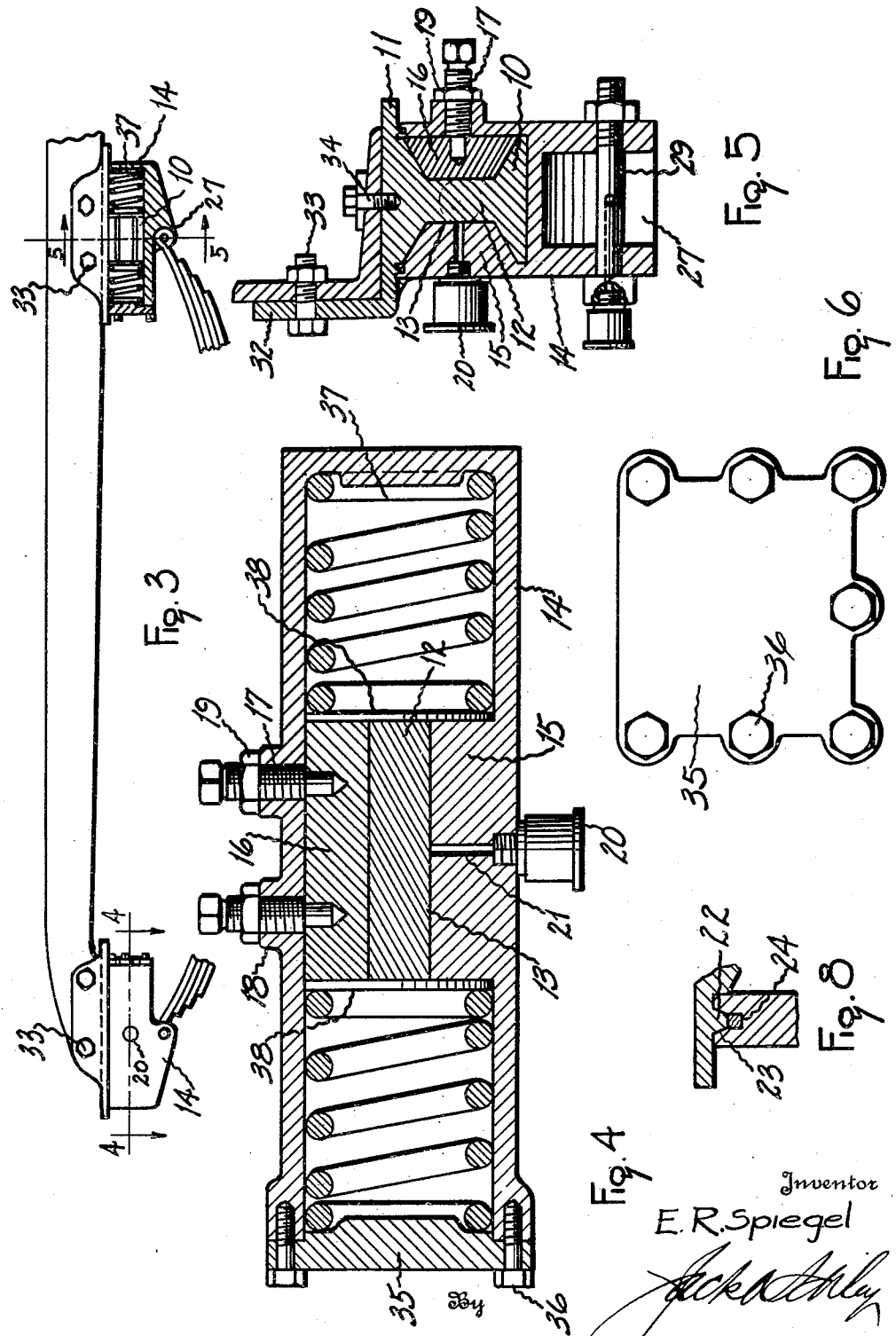

1,818,105

UNITED STATES PATENT OFFICE

EDWARD R. SPIEGEL, OF DALLAS, TEXAS, ASSIGNOR OF THIRTY-FOUR PER CENT TO JOHN W. MILLER AND FIFTEEN PER CENT TO JACK A. SCHLEY, OF DALLAS, TEXAS

SPRING MOUNTING FOR MOTOR VEHICLES

Application filed November 15, 1928. Serial No. 319,491.

This invention relates to new and useful improvements in spring mountings for motor vehicles.

It is customary to support motor vehicle springs by spring shackles, each shackle being pivoted at its upper end to the frame and at its lower end to one end of the spring. The spring is bowed downwardly and when actuated elongates, thus swinging the shackle. The shackle can swing only in a circumscribed arc, whereas the end of the spring not only moves in the arc of the shackle but also moves tangentially to said arc and frequently the elongation of the spring bucks the swing of the shackle, thus subjecting the vehicle to a severe shock, which, if from the front spring, is transmitted to the steering gear and wheel.

Where springs are mounted with shackles, considerable side play develops and this is aggravated by wear. It is obvious that a very slight side or lateral sway at the shackle would be multiplied many times at the wheel base and throughout the body of the vehicle.

One object of the invention is to provide a spring mounting arranged to move longitudinally with relation to the spring and not in an arc as does a shackle, thus permitting a free elongation and contraction of the spring in a new and novel manner.

A particular object of the invention is to provide a spring mounting or hanger to which the end of the spring is hinged and which is arranged to slide relatively of a fixed support on the frame of the motor vehicle, whereby a more elastic and substantial mounting is provided.

Another object of the invention is to provide cushioning means whereby the sliding movement of the mounting is not only cushioned, thus forming an efficient shock absorber, but such movement is limited, thereby making for safety.

A still further object of the invention is to provide an elongated guide, whereby the rectilinear movement of the mounting is held true, together with adjustable means for compensating the wear so as to entirely eliminate side play and thus avoid side sway in the mounting.

An important object of the invention is to arrange the mounting separate and distinct from the leaves of the spring and to hinge the mounting to the spring so that an ordinary commercial spring may be used and no unnecessary wear or duty is placed upon such spring.

Still another object of the invention is to provide a mounting which will be substantially dust and dirt proof and which will contain a lubricant for an indefinite period.

The invention possesses several advantages. By its use a maximum ease of riding is obtained and road shocks are substantially eliminated, which is an improvement over the shock absorbers now in common use, because the latter will not compensate both minimum and maximum shocks, whereas the structure involved in this invention will act effectively under all conditions.

Another advantage is that shimmying of the front wheels, as well as back-lash, will be absorbed in the mountings and not transmitted to the steering gear.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a partial view of the left hand side of the frame and springs of a motor vehicle equipped with spring mountings constructed in accordance with the invention, Fig. 2 is a similar view of the right hand side, Fig. 3 is a partial view of the forward end of the left hand side of the frame and springs equipped with spring mountings in accordance with this invention and showing one in elevation and the other in section, Fig. 4 is an enlarged horizontal cross-sectional view taken on the line 4—4 of Fig. 3, Fig. 5 is an enlarged transverse vertical sectional view taken on the line 5—5 of Fig. 3, Fig. 6 is an end elevation of the mounting shown in Fig. 4, and Fig. 7 is a detail of the spring cradle.

In the drawings the numeral 10 designates a hanger including a top plate 11 and a guide block 12 depending from the central portion of the plate. The guide block is formed with longitudinal grooves 13 along each side, each groove having its upper and lower walls beveled outwardly.

An elongated casing or housing 14 is mounted to slide longitudinally on the block 12, being considerably greater in length than the blocks, but less in length than the plate 11, so that said plate will cover the upper open side or top of the casing, during all the movements of the latter. The casing is provided with guides 15 and 16, respectively, shaped to fit the grooves 13, whereby the casing is slidably confined on said block.

The guide 15 is made integral with the side wall of the casing, while the guide 16 is held in the groove by adjusting screws 17 mounted in bosses 18 on the opposite side wall of the casing. Lock nuts 19 are employed to fasten the screws. By adjusting the screws the guide 16 may be forced into its groove and wear and lateral play thus taken up. The device may be lubricated from a grease cup 20 through a duct 21 leading to the block 12; and heavy oil may be placed in the casing if desired. To form an oil seal with the plate 11, V-shaped ribs 22 on the under side of the plate ride in complementary grooves 23 in the upper side edges of the casing. Packing strips 24 may be seated in trenches in the bottoms of the grooves. Packing strips 25, seated in grooves 26 across the ends of the casing engage the under side of the plate.

On the bottom of the casing 14 a transverse spring cradle 27 is provided and the eye 28 of the vehicle spring is seated therein. For retaining the eye a transverse bolt 29 is passed through the sides of the cradles. By this arrangement the thrust of the spring is taken by the cradle and not by the bolt, however upon the retraction of the spring the pull is upon the bolt.

The spring mounting may be placed at each end of the spring or at one end only. In Figs. 1 and 2 a typical mounting arrangement is illustrated. The left front spring A has a mounting at each end, while the right front spring B has a mounting at its rear end only, the forward end of said spring being supported by the frame in the usual manner. The rear springs C have their rear ends equipped with the spring mounting while their forward ends are hung by the usual shackles 30. The top plate 11 may be secured to the vehicle frame in any suitable manner, but I prefer to form a bracket 32 on one side of the top plate and secure this bracket to the outer side of the frame by bolts or rivets 33. Pilot screws 34 may also be employed to hold the hanger in place against the under side of the frame.

In order to mount the casing 14 on the hanger block 12 one end of said casing is left open (Figs. 4 and 6) and a cap 35 secured to the end of said casing by bolts 36 is used to close said end. To limit the sliding movement of the casing and to cushion the same, coiled springs 37 are placed in the casing at each end of the hanger.

Each spring has one end bearing against the end of the casing and its opposite end resting against a washer 38 engaging the ends of the hanger block 12 as well as the ends of the guides 15 and 16. When the casing is slid the guides 15 and 16 will carry one washer away from the end of the block, while the other washer will be held against the opposite end of the said block by the other spring 37, which will be compressed by the end of the casing.

It is obvious that the sliding movement of the casing in either direction will be cushioned by the compression of one of the springs 37. When a spring has been fully compressed it acts as a stop to arrest further sliding of the casing. By observing Figs. 1, 2 and 3 it will be seen that when one of the springs A, B and C is actuated by road shock it will alternately elongate and contract. In the case of the spring A the casings 14 at each end of the spring will slide outwardly when the spring elongates and such casings slide inwardly when the spring is contracted. The eyes 28 of the spring A will move in rectilinear directions and not in arcs and therefore no resistance will be offered to the flexing of said spring.

Casings at each end of the left hand front spring are used because this spring is nearest the steering post and wheel. A casing 14 is mounted at the rear end of the right hand front spring B, while casings 14 are mounted at the rear ends of the rear springs C, the opposite ends of the springs B and C being supported by the usual shackles 30.

The swinging of one end of a spring will not cause the spring to buckle, because the opposite end of the spring is free to move with the sliding casing. The sliding casings are cushioned by the coiled springs 37 therein and thus shocks transmitted to the vehicle springs or undue flexing of the latter, will be absorbed by the sliding casings and the coiled springs 37. Of course any cushioning means could be used instead of the springs 37 and the invention is not to be limited thereto.

If the front wheels of the vehicle (not shown) strike an obstruction or a road cavity, the front springs A and B will be violently flexed, alternately elongating and contracting. However, each spring A and B will elongate and contract without resistance other than the coiled springs 37 which are sustained by the hanger blocks 12 rigid on the vehicle frame.

By employing sliding mountings at each end of the front spring A at the left and a sliding mounting at one end of the right front spring B, with a shackle at the opposite end, the front axle will have a tendency to move forward and rearward more on the left side than on the right side, when the wheels encounter an obstruction. This movement will only be slight and it will be in the nature of an oscillation, but it will dissipate the shock. Thus instead of transmitting the violent flexing of the front springs to the vehicle and also to the steering gear, it will be absorbed and mitigated, thereby ironing out rough stretches of road, making for smooth riding and substantially eliminating back-lash, shimmying and side sway.

From a standpoint of safety and practicability the fixing of the hanger 10 to the vehicle frame and the mounting of the sliding casing 14 thereon is a vast improvement in the art. The casing must be dust and water proof and its bottom must be closed to hold oil. The adjustable guide 16 not only takes up wear but co-operates with the hanger block 12 in taking up side play and as casing cannot twist or the eye 28 of the spring move sideways, the chance of side sway usually found in shackle mountings will be reduced to a minimum. The mounting of the spring eyes 28 in the cradles 27 permits the use of a standard commercial spring which may be purchased in the open market.

Various changes in the size and shape of the different parts, as well as modifications and alterations, may be made within the scope of the appended claims.

What I claim, is:

1. A spring mounting comprising a hanger for stationary attachment to the frame of a motor vehicle, a casing slidable on the hanger, means for attaching the end of a vehicle spring to the casing, and means interposed between the hanger and the casing and adjustable for taking up the wear therebetween.

2. The combination with the frame of a motor vehicle and the front and rear springs thereof, of hangers rigidly attached to the frame, and casings slidable on said hangers and attached to the rear ends of the rear springs and to the front end of one front spring and to both ends of the other front spring, whereby the front axle and wheels will oscillate upon encountering an obstruction.

3. A spring mounting comprising a hanger for stationary attachment to the frame of a motor vehicle longitudinally of said frame and including a depending longitudinal block, a casing enclosing and slidable longitudinally on the block, means for attaching the end of a vehicle spring to the casing, and means for cushioning the sliding movement of the casing.

4. A spring mounting comprising a hanger for stationary attachment to the frame of a motor vehicle longitudinally of said frame and including a depending longitudinal block, a casing enclosing and slidable longitudinally on the block, means for attaching the end of a vehicle spring to the casing, and means within the casing for cushioning and limiting the sliding movement of the casing in either direction.

5. A spring mounting comprising a hanger including a top plate and a block depending from the plate, a casing open only at its top and having sliding engagement with the under side of the top plate, guides in the casing engaging the block for permitting sliding movement of said casing, means to limit the sliding movement of the casing to the limits of the casing, whereby said casing is constantly covered, and means for attaching the end of a vehicle spring to the bottom of the casing.

6. A spring mounting comprising a top plate, means for securing the plate against movement upon the frame of a motor vehicle, a block depending from the plate and having longitudinal grooves on each side, a rectangular casing enclosing said block and slidable thereon, guides carried by the casing and engaging in the grooves of the block, one of said guides being adjustable to compensate wear, and means for attaching one end of a vehicle spring to the casing.

7. A spring mounting comprising a top plate, means for securing the plate against movement upon the frame of a motor vehicle, a block depending from the plate and having longitudinal grooves on each side, a rectangular casing enclosing said block and slidable thereon, guides carried by the casing and engaging in the grooves of the block, one of said guides being adjustable to compensate wear, means for attaching one end of a vehicle spring to the casing, and means co-acting with the block for cushioning the sliding movement of the casing.

8. A spring mounting comprising a top plate, means for securing the plate against movement, upon the frame of a motor vehicle, a block depending from the plate and having longitudinal grooves on each side, a rectangular casing enclosing said block and slidable thereon, guides carried by the casing and engaging in the grooves of the block, one of said guides being adjustable to compensate wear, means for attaching one end of a vehicle spring to the casing, and coiled springs within the casing on each side of the block co-acting with said block and said guides for cushioning the sliding movement of the casing.

9. In a mounting for motor vehicle springs, a swinging shackle for suspending one end of the spring, a hanger for stationary attachment to the frame of the motor vehicle, a casing slidable on the hanger longitudinally of the spring, and means for attaching the opposite end of the spring to said casing, whereby an elongation or retraction of the spring longitudinally slides said casing on its hanger.

10. In a mounting for motor vehicle springs, a swinging shackle for suspending one end of the spring, a block for stationary attachment to the frame of the motor vehicle, a casing slidable on the block longitudinally of the spring, and means for attaching the opposite end of the spring to said casing whereby an elongation or retraction of the spring longitudinally slides said casing on its block.

11. A spring mounting as set forth in claim 9 with means for cushioning the sliding movement of the casing.

In testimony whereof I affix my signature.

EDWARD R. SPIEGEL.